March 12, 1946. W. F. MOORE 2,396,383
GAUGE
Filed March 31, 1942
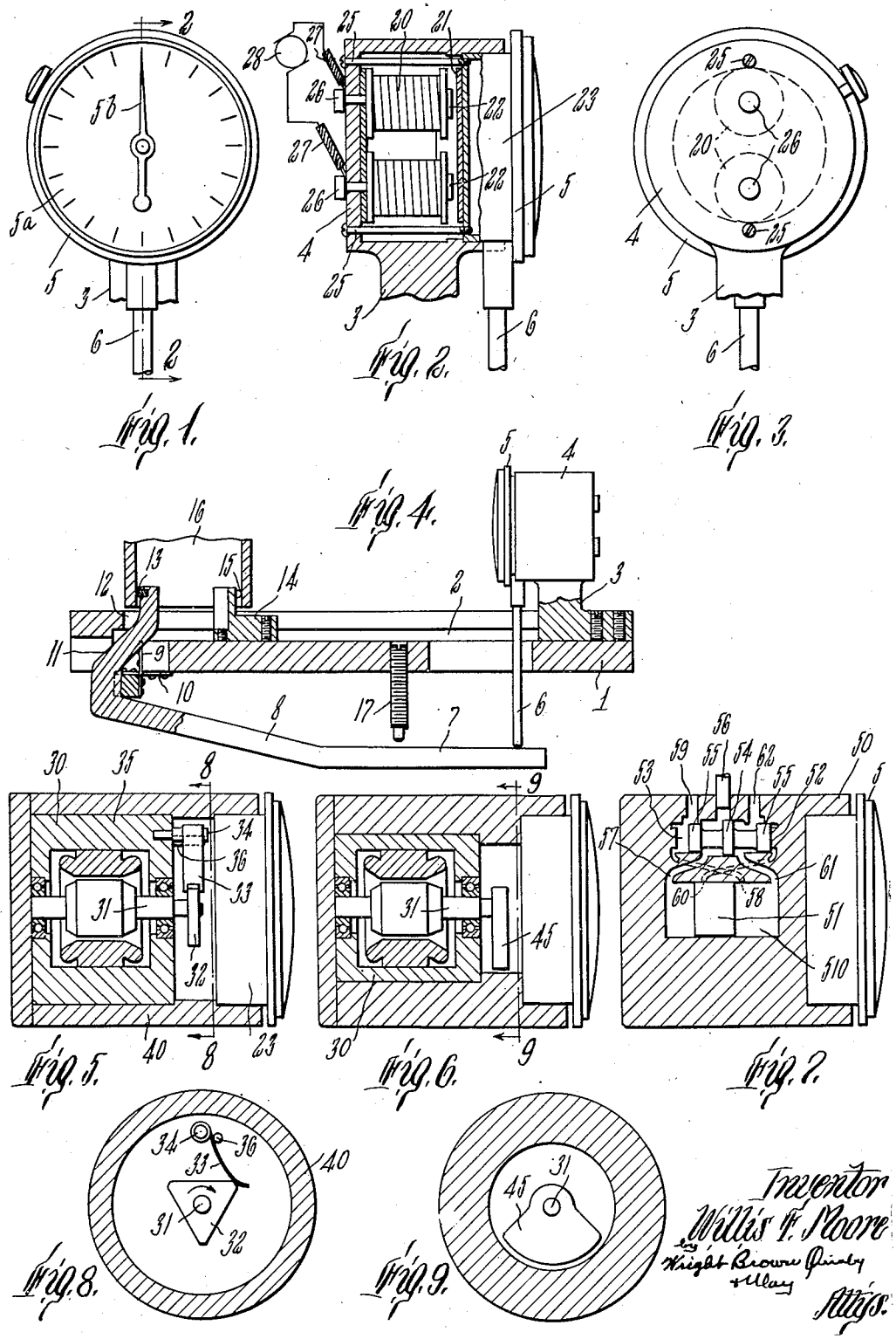
Inventor
Willis F. Moore Patented Mar. 12, 1946

2,396,383

UNITED STATES PATENT OFFICE 2,396,383

GAUGE

Willis F. Moore, Springfield, Vt., assignor to Bryant Chucking Grinder Company, Springfield, Vt., a corporation of Vermont Application March 31, 1942, Serial No. 436,934

6 Claims. (Cl. 33—148)

This invention relates to gauges and has for an object to increase the sensitivity thereof so that the gauge will respond more accurately to small gauging changes.

A further object is to provide a dimension measuring gauge in which sticking of the various moving parts is prevented so that the gauging response is highly sensitive.

Still another object is to provide a gauge wherein the work piece to be gauged may be placed in approximately correct position whereupon the work contacting elements of the gauge are properly related to the work automatically to give the correct gauging indication.

High accuracy, sensitivity, and automatic positioning of the work are realized in accordance with this invention by subjecting the gauging parts and through them the work to rapid vibration. In so far as the gauging mechanism is concerned, this vibration prevents sticking of relatively movable parts causing them, during a gauging action, to be in a "floating" condition wherein they respond immediately and fully to gauging pressure. This vibration also causes the work to be gauged to tend to center itself with relation to the work engaging portions of the gauge when left free to do so. Thus when the work pieces to be gauged are placed near to proper gauging position and left there, the vibration may cause the work piece and gauge to move slightly relatively to proper gauging relation.

For a more complete understanding of this invention, reference may be had to the accompanying drawing in which Figure 1 is a front elevation of a position dial indicator which may be used as the indicating portion of a dimension measuring gauge and provided with a magnetic vibrator.

Figure 2 is a detail section on line 2—2 of Figure 1, but with the indicator shown in side elevation.

Figure 3 is a rear elevation of the same.

Figure 4 is a view partly in side elevation and partly in section of an internal gauge embodying the vibrated indicator of Figures 1 to 3, inclusive.

Figures 5, 6 and 7 are views similar to a portion of Figure 2, but showing different vibrating mechanisms.

Figures 8 and 9 are detail sections on line 8—8 of Figure 5 and line 9—9 of Figure 6, respectively.

In Figure 4 a simple form of dimension measuring gauge has been illustrated comprising a support 1 to one end of which is adjustably fixed in a longitudinal way 2 therein a support 3 including a casing 4 in which is mounted a position dial indicator 5 of conventional construction. Such an indicator comprises a dial 5a over which a pointer is movable by axial motion of a stem 6. The stem 6 of this indicator engages the long arm 7 of a lever 8 which is fulcrumed by one or more pairs of angularly related leaf springs 9 and 10 to the support 1. The short arm 11 of the lever 8 extends through a hole 12 in the support 1 and carries on its upper end a work-engaging element 13. Also carried by the support 1 and adjustable therealong in the way 2 is a slide 14 carrying one or more fixed work-engaging elements 15. This gauge as shown is for gauging internal work, a piece of work 16 to be gauged being shown as placed in gauging relation to the elements 13 and 15. A stop 17 adjustably threaded through the support 1 may be employed to limit the upward motion of the long arm 7 of the lever 8. This gauge as shown, per se, is not subject matter of this invention, as it forms subject matter of a co-pending application Serial Number 436,935 filed March 31, 1942, now patent No. 2,348,018.

The present invention has to do with increasing the sensitivity of a gauge such as the one illustrated in Figure 4 or any dimension measuring gauge which employs relatively moving parts which may tend to stick. For preventing such sticking the gauge is subjected to rapid vibration while in use. The case 4, as shown best in Figure 2, may have positioned therein coils 20 of an electromagnet having an armature of magnetic material 21 positioned adjacent to the poles 22 of the electromagnet, but out of contact therewith and fixed by any suitable means to the case 23 of the position indicator 5. The case 4 may be secured to the case 23 by any suitable means, such as the screws 25, and the coils 20 have terminals 26 extending through the wall of the case 4 and to which conductors 27 may be secured. These conductors lead to a suitable source of alternating current 28, current from this source then acting to impart rapid vibration to the armature 21 and thus vibrating the mechanism within the position indicator 5, preventing it from coming to rest. In condition of rest the relatively moving parts would have the friction of rest but subjecting these parts to vibration causes them to be in a floating condition, in which condition they respond immediately to any forces exerted thereon. The rate of vibration should be well above the natural period of vibration of the indicating needle and of other gauging parts so that there is no tendency for them to vibrate in resonance, causing undesired distortion forces to be imparted to the indicating needle. Ordinarily the rate of vibration is satisfactory when connected to an ordinary power or lighting alternating current of usual frequency.

This invention is not limited in its broadest aspects, however, to any particular type of vibrating mechanism, other types being shown in Figures 5 to 9. For example, in Figures 5 to 8, there is shown a small motor 30 within the casing and having fixed to its armature 31 a cam 32, which as shown has three lobes, although two or more than three might be employed, if desired, depending upon the speed of the motor and the rate of vibration desired. Bearing against this cam 32 is a spring 33 shown as secured to a post 34 projecting from the motor casing 35. A pin 36, also projecting from the motor casing 35, tends to retain the spring bearing resiliently against the cam 32. As this motor is rotated, therefore, the spring 33 is vibrated and its vibration is transmitted to the outer casing 40 in which the position indicator 23 is carried.

In Figures 6 and 9, instead of employing the cam 32 on the motor shaft, a weight 45 is carried thereby eccentric to its center of mass so that it produces unbalance when the motor is rotated, the rotation of this weight then producing the desired vibration of the mechanism.

In Figure 7 the casing 50 in which the position indicator 5 is carried is provided with a fluid pressure actuated vibrating mechanism. This comprises a plunger or piston 51 slidable in a cylindrical recess 510. On opposite sides of this piston 51 fluid under pressure, preferably air, is alternately admitted and discharged as controlled by a reciprocating valve 52. This valve 52 is slidable in a valve chamber 53 and is provided with a central and end enlarged valve heads 54 and 55. Fluid under pressure is admitted to the valve chamber as through the central supply pipe 56. Fluid pressure passes into the valve chamber through the supply pipe 56, and in the position shown in Figure 7 passes between the central valve head 54 and the left hand valve head 55 through the passage 57 to the left hand end of the piston 51, while fluid discharges from the right hand side of the piston 51 through the passage 58 to the left hand end of the valve chamber 53 and out through a discharge passage 59. As soon as the motion of the piston 51 to the right covers the passage 58 and opens the passage 60, the fluid under pressure is prevented from discharging from the right hand side of the piston and fluid under pressure passes through the passage 60 to the right hand end of the valve chamber 53, forcing the valve to the left so that the pressure from the pipe 56 then passes to the right of the valve head 54 and through the passage 61 to the right hand end of the piston 51, reversing the motion of the piston and moving it to the left, at the same time the fluid under pressure at the left of the piston 51 being discharged through the passage 60 around the right hand end of the valve and out through the discharge 62. Thus the piston 51 is moved rapidly in alternate directions, thus producing the desired vibration of the gauge.

Not only does this vibration retain the gauge parts in sensitive relation such that they are immediately affected by gauging pressure, but this vibration also tends to position the gauge and work piece relatively to proper gauging position when the work is left free. For example, when a work piece such as 16 is placed in position with the gauging elements 13 and 15 engaging with its inner periphery, and is left free it may adjust itself slightly, or center itself, so that the gauging elements are in proper gauging position thereto, particularly where the work piece is of relatively light weight. Thus any inaccuracies due to inadvertent pressure by the hand of the operator on the work during a gauging operation is avoided, the operator merely letting the work piece go free after it has been placed in approximately gauging position on the support 2. Because of this action of the work piece, the frequency of the vibration may be chosen with due regard to the weight of the work piece, as well as to the masses involved in other portions of the gauging mechanism to take fullest possible advantage of the vibration. In cases where the work piece itself is heavy and is not much affected by the rate of vibration employed, the gauge itself may be left free to adjust its own position or center itself with reference to the work being gauged.

From the foregoing description of certain embodiments of this invention, it should be evident to those skilled in the art that various changes and modifications might be made without departing from the spirit or scope of this invention as defined by the appended claims.

I claim:

1. In combination, a dimension measuring gauge including an indicator, a casing holding said indicator, work engaging elements in operative relation to said indicator and external to said casing, and vibration producing means within said casing in vibrating relation to said indicator.

2. In combination, a dimension measuring gauge including a position indicator, a casing holding said indicator, gauging means external to said casing and in operative relation to said indicator, and vibration producing means within said casing in vibrating relation to said indicator.

3. In combination, a dimension measuring gauge including a position indicator, a casing holding said indicator, an electromagnet in and carried by said casing, an armature for said electromagnet carried by said indicator, and means connecting said electromagnet to a source of alternating current.

4. In combination, a dimension measuring gauge including a position indicator, a casing holding said indicator, a motor in and carried by said casing, a weight within said casing, and driving connections from said motor to said weight eccentric to the center of mass of said weight.

5. In combination, a dimension measuring gauge including a position indicator, a support for said indicator, work engaging elements carried by said support and in operative relation to said indicator, and a fluid pressure hammer mechanism carried by said support for vibrating said support and parts carried thereby.

6. In combination, a dimension measuring gauge, a fluid pressure hammer mechanism carried by said gauge for vibrating said gauge, and means connecting said mechanism to a source of fluid pressure.

WILLIS F. MOORE.